(12) United States Patent
Monnier et al.

(10) Patent No.: US 10,207,879 B2
(45) Date of Patent: Feb. 19, 2019

(54) METHOD AND APPARATUS FOR HONING A WORKPIECE

(71) Applicant: Gehring L.P., Farmington Hills, MI (US)

(72) Inventors: Dennis Monnier, Shelby Township, MI (US); Wayne Starosciak, Clinton Township, MI (US); Frank Hummel, Farmington Hills, MI (US)

(73) Assignee: Gehring L.P., Farmington Hills, MI (US)

( * ) Notice: Subject to any disclaimer, the term of this patent is extended or adjusted under 35 U.S.C. 154(b) by 0 days.

(21) Appl. No.: 15/632,306

(22) Filed: Jun. 24, 2017

(65) Prior Publication Data

US 2018/0093837 A1    Apr. 5, 2018

Related U.S. Application Data

(60) Provisional application No. 62/403,891, filed on Oct. 4, 2016.

(51) Int. Cl.

| | |
|---|---|
| *B23Q 7/10* | (2006.01) |
| *B65G 65/02* | (2006.01) |
| *B24B 33/00* | (2006.01) |
| *B24B 33/02* | (2006.01) |
| *B24B 41/00* | (2006.01) |
| *B24B 5/35* | (2006.01) |
| *B65G 17/32* | (2006.01) |
| *B65G 61/00* | (2006.01) |
| *B65G 65/00* | (2006.01) |

(52) U.S. Cl.
CPC ............... *B65G 65/02* (2013.01); *B23Q 7/10* (2013.01); *B24B 5/355* (2013.01); *B24B 33/00* (2013.01); *B24B 33/02* (2013.01); *B24B 41/00* (2013.01); *B65G 17/32* (2013.01); *B65G 61/00* (2013.01); *B65G 65/005* (2013.01)

(58) Field of Classification Search
CPC .............................. B24B 5/355; B24B 33/02
USPC ......... 198/339.1, 346.1; 414/222.13, 222.09; 451/331
See application file for complete search history.

(56) References Cited

U.S. PATENT DOCUMENTS 4,533,034 A * 8/1985 Gregg .................. B23Q 7/1489
                                                        198/345.3
4,557,655 A * 12/1985 Berg ........................ B65G 1/08
                                                        198/339.1

(Continued)

*Primary Examiner* — William R Harp
(74) *Attorney, Agent, or Firm* — Burgess Law Office, PLLC

(57) ABSTRACT

A honing machine using a robot to load gears into a loadbox at a loadbox station. The loadbox moves downstream to a position over an empty pallet in a pallet load station where the gears are released into the empty pallet. A series of downstream machining stations performing a series of honing operations on the bores of the gears in a series of pallets. A removal mechanism removing the honed gears simultaneously from the pallet at a pallet unload station. An overhead gripper on a movable gantry grips the empty pallet at the unload station and returns the pallet to the pallet load station where the pallet is reloaded with additional gears from the loadbox. The honing machine can continuously hone gears using only one pallet at each machining station and one pallet at the pallet loading station.

20 Claims, 7 Drawing Sheets

(56) References Cited

U.S. PATENT DOCUMENTS

| | | | | |
|---|---|---|---|---|
| 4,603,456 | A | * | 8/1986 | Hiroyasu .............. B23Q 7/1489 29/33 P |
| 4,610,595 | A | * | 9/1986 | Hockersmith ......... B23Q 7/003 198/468.6 |
| 4,747,193 | A | * | 5/1988 | Hashidate ............ B23Q 7/1442 198/346.1 |
| 5,160,011 | A | * | 11/1992 | Yoshiji ................. B23Q 7/1426 198/345.3 |
| 5,334,246 | A | * | 8/1994 | Pietrzykowski, Jr. .... B05C 3/09 118/423 |
| 5,992,009 | A | * | 11/1999 | Bonura .................. H02K 15/00 198/346.2 |

* cited by examiner

METHOD AND APPARATUS FOR HONING A WORKPIECE

CROSS-REFERENCE TO RELATED APPLICATIONS

This application claims the benefit of U.S. Provisional Application No. 62/403,891, filed Oct. 4, 2016. The disclosure of the above application is incorporated herein by reference.

BACKGROUND OF THE INVENTION

1. Field of the Invention

The present invention relates generally to the field of honing machines and, more particularly, to a method and apparatus for loading and unloading a honing machine.

2. Description of Related Art

Honing machines for honing the internal bores of gears are known in the art. The prior art includes loading a plurality of gears into a plurality of fixtures mounted on a fixture carrier or pallet and honing the plurality of gears simultaneously by plunging honing tools through the bores of the gears. An example of a prior art process for honing gears includes loading the gears into individual fixtures or gear holders on a fixture carrier, such as a pallet, at a pallet load station with the bores of the gears in axial alignment. The pallet is transferred to a first machining station in the machine for a rough hone procedure or step. After completion of the rough hone process, the pallet and, correspondingly the gears, are transferred to a second machining station for a semi-finish honing of the bores, after which the pallet and, correspondingly the gears, are transferred to a third machining station for a finish honing of the bores. Upon completion of the honing process, the pallet is transferred to an unload station where the gears are removed from the fixtures in the pallet and delivered to an outlet station. After the gears are removed, a conveyor returns the pallet to the load station to receive a new load of gears.

The pallet load station, the three machining stations, and the unload station all have pallets in them at the same time, and the pallets cycle continuously through the machine. To achieve maximum throughput, as soon as a first pallet leaves one station, a second pallet takes its place. A machine operating at full capacity needs five pallets, one at the pallet load station, one at each of the three machining stations, and one at the unload station.

The slowest segment of the prior art process is loading the gears into the individual fixtures on a fixture carrier. Loading the gears into the fixtures must be performed one gear at a time, a typical pallet carries 10 fixtures, so 10 gears must be loaded at the initial or pallet load station before the pallet can be transferred to the first machining station.

The next slowest segment of the process is using a conveyor to return the pallet to the pallet load station. Although the distance is not that great, the return takes a few seconds. Machines operating in a production environment operate continuously, and reducing a 50 second cycle time of a machine by a few seconds produces a measurable increase in machine throughput.

SUMMARY OF THE INVENTION

A honing machine having a plurality of honing stations and a plurality of pallets transporting workpieces between the honing stations. The honing machine including a load station and an unload station separate from and spaced from said honing stations. A gantry, including a pallet gripper operative to engage a pallet, moves the pallets from the unload station to the load station, wherein the number of the pallets in the honing machine is always less than the number of honing stations.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

In the different figures, equivalent parts are always provided with the same reference symbols, wherein they are generally described only once.

Figure 1:
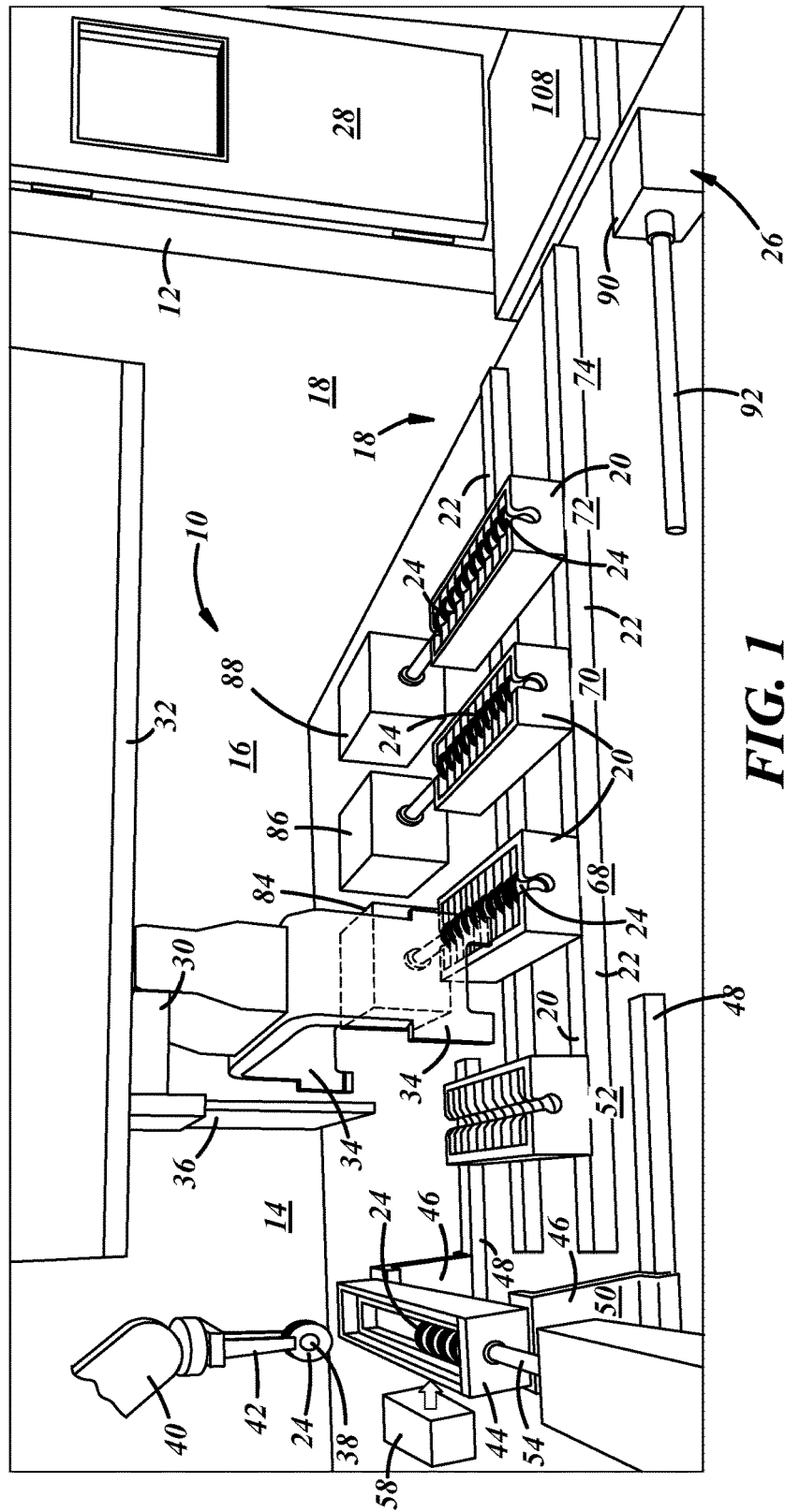
FIG. 1 is a perspective view of a honing machine according to an exemplary embodiment of the present invention.
Figure 4:
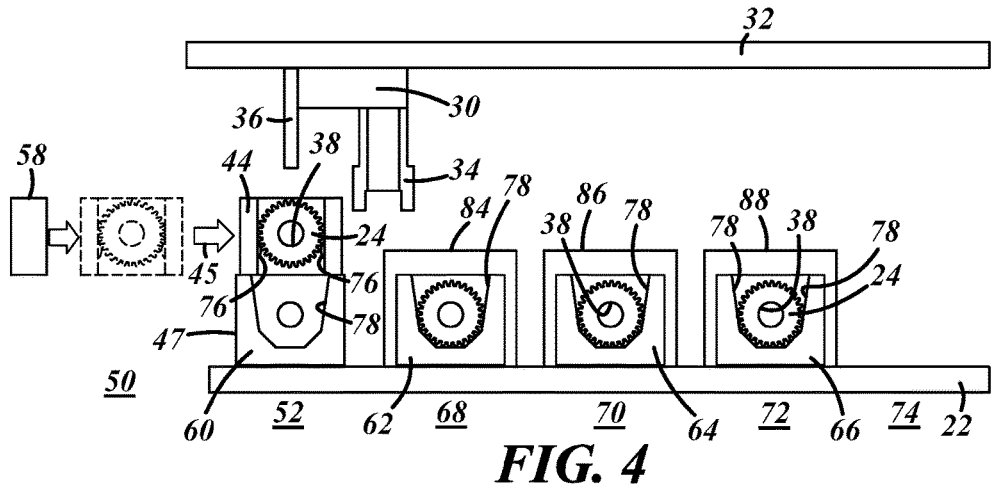
FIG. 4 is a partial, side view of pallets in the honing machine of FIG. 1 and an overhead gantry mechanism.
Figure 5:
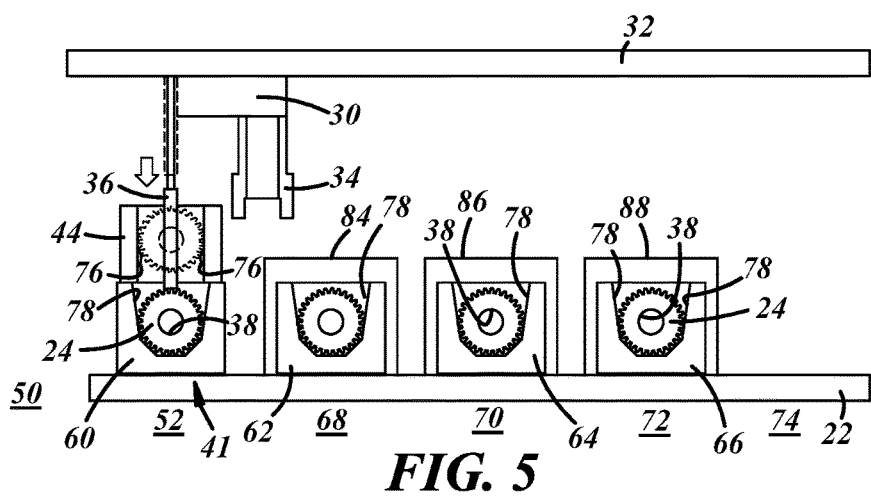
FIG. 5 is a partial, side view of pallets in the honing machine of FIG. 1 showing a ram on the gantry engaging gears in a pallet.

Referring to the drawings, FIG. 1 is a perspective view of a honing machine, seen generally at 10. The honing machine 10 surrounded by a machine enclosure 12, and having a loading area 14, a machining area 16, and an unloading area 18. A plurality of pallets 20, supported on pallet rails 22, move through the honing machine 10 from the loading area 14 to the machining area 16 and then the unloading area 18. The pallets 20 are loaded with gears 24 for honing. The pallets 20, and correspondingly the gears 24, progress through the machine 10 from the loading area 14 to the unloading area 18, and are removed from the pallet 20 in the unloading area 18 by a skewer 26 as described in connection with FIGS. 8-11. A side access door 28, in the machine enclosure 12, is provided for pallet inspection or pallet replacement as described in connection with FIG. 12. An overhead gantry 30, shown herein suspended on gantry rails 32, is positioned above the pallet rails 22. The overhead gantry 30 may include a pallet gripper mechanism 34 and a ram 36. As illustrated in FIGS. 4 and 5, the ram 36 may assist in loading and checking the gears 24 after they have been loaded into the pallet 20.

A robot or robotic loader 40, or load mechanism, operates to load the gears 24 in the honing machine 10. The robotic loader 40 picks up workpieces, such as the gears 24 having axial bores 38, from a workpiece supply (not shown) and places the gears 24 in a loadbox 44 in the loading area 14 of the honing machine 10. As used herein, the term robot or robotic refers to a mechanism guided by automatic controls; sometimes, used to perform repetitive tasks. As illustrated, the loadbox 44 rests on loadbox supports 46. The loadbox supports 46 slidably mounted on loadbox rails 48 whereby the loadbox 44 moves, from a loading position or station 50, shown in FIG. 1, to an unloading position, or as referred to a pallet load station 52, over a pallet 20 to load the pallet 20 as described in connection with FIGS. 4-5.

Figure 2:
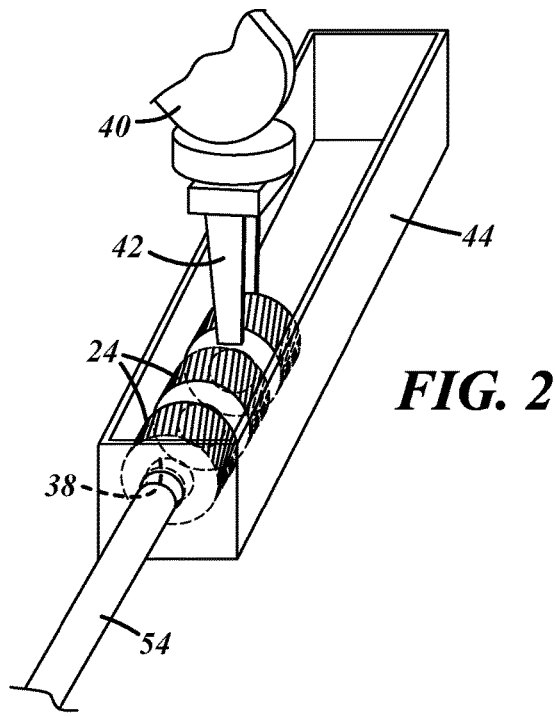
FIG. 2 is a perspective view of a portion of a robotic loader placing gears into a loadbox.

FIG. 2 is a perspective view of the end effector or opposed jaws 42 of the robotic loader 40 placing gears 24 into a loadbox 44. The robotic loader 40 may load the gears 24 into the loadbox 44 at a loadbox loading position or station 50 with the bores 38 of the gears 24 in axial alignment.

Figure 3A:
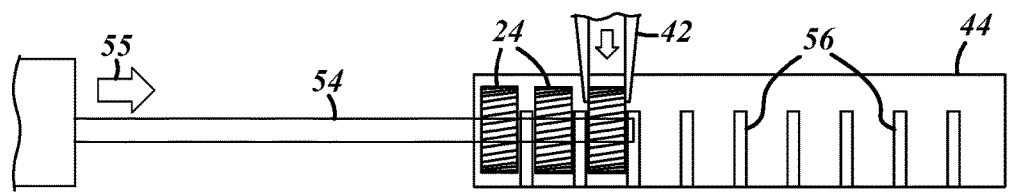
FIG. 3A-3C are schematic views illustrating a probe checking gears in a loadbox.
Figure 3B:
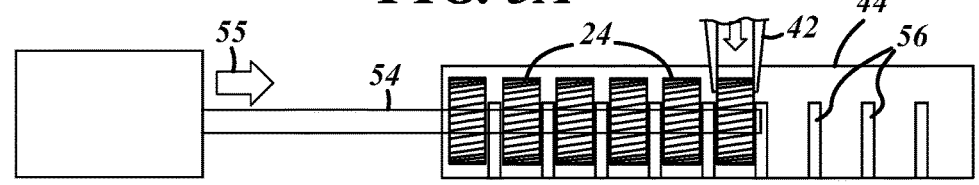
Figure 3C:
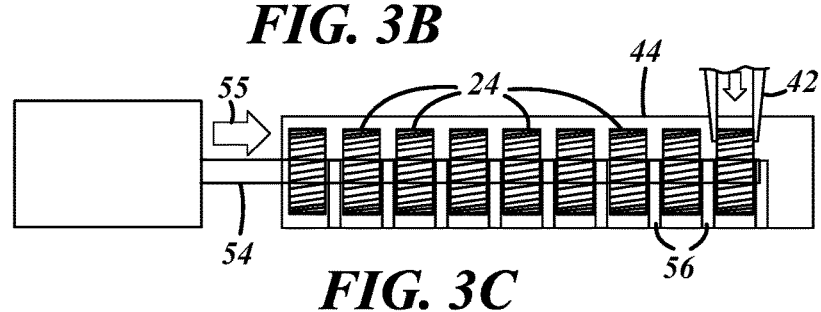

FIGS. 3A-3C show a movable probe 54 for checking the bores of gears in the loadbox 44. The probe 54 enters the bores 38 of the gears 24 in the direction of the arrow 55 to pre-gauge the bores 38 one at a time as the gears 24 are placed into the loadbox 44. Upon determining that one or more of the bores 38 of the gears 24 is undersized, has a burr, or some other abnormality that would prevent the later honing of the bore 38 in the honing machine 10, the gear 24 may be removed from the loadbox 44 by the robotic loader 40 and replaced with another gear 24, or the entire loadbox 44 with all of the gears 24 may be removed and replaced, or a signal sent to an operator for manual intervention. The probe 54 may use an air sensor to determine gear bore size or other conditions prior to honing, or other types of probes may be used. Dividers 56 in the loadbox 44 may hold the gears 24 in the proper orientation and relative spacing for engagement by the probe 54.

Turning now to FIG. 4, there is shown a side view of an exemplary embodiment of the honing machine illustrating four pallets 60, 62, 64, and 66 in the honing machine 10. An overhead gantry 30 transfers or moves the four pallets 60, 62, 64, and 66 in a sequential manner from the load station 52 to unload station 74. FIG. 4 shows the honing machine 10 having six stations. Station 50 is the loadbox loading station, station 52 is a pallet load station, station 68 is a first honing station, station 70 is a second honing station, station 72 is a third honing station, and station 74 is a pallet unloading station. Initially the loadbox 44 is supported at the loadbox loading station 50 at a height above the height of the pallet 60 positioned in the pallet loading station 52. After being loaded with gears 24, a loadbox mover 58 moves the loadbox 44, in the direction of the arrow 45, to a position directly over the pallet 60 in the pallet loading station 52. The loadbox mover 58 may be an actuated piston or lever that transfers the loadbox 44 between the loadbox loading station 50 and the position over the pallet 60 located in the pallet load station 52. Once in position over the pallet 20, a gear holding mechanism 76, for example a retractable finger or flap in the loadbox 44, is released whereby the gears 24 in the loadbox 44 drop in pallet 60 located in the pallet load station 52. This procedure fills, drops all of the gears 24 from the load box 44 into the empty pallet 60 in the pallet load station 52 in a single step filling the pallet 60 with gears 24 in the same time that it normally takes to load one gear 24 in a single pallet 20.

As illustrated in FIG. 4, initially the ram 36 on the overhead gantry 30 is placed in a pre-engagement position over the pallet 60 in the pallet load station 52. Each pallet 60, 62, 64, and 66 may include a fixture 78 that receives and positions the gears 24 in the respective pallets 60, 62, 64, and 66 for the honing operation. The fixture 78 holding the gears 24 in a gimbal type mount allowing the gears 24 to adjust position slightly to align with the axis of a honing tool.

FIG. 5 shows a side view of the pallets 60, 62, 64, and 66 in the honing machine 10 with the ram 36 on the gantry 30 engaging the gears 24 in the pallet 60 located in the pallet load station 52. As illustrated, the ram 36 contacts the gears 24 to seat the gears 24 in the fixture 78 in the pallet 60. In addition, the ram 36 determines if any of the gears 24 cannot be seated, measures the height of the gears 20, and performs similar measurements on the gears 24 in the pallet.

Figure 6:
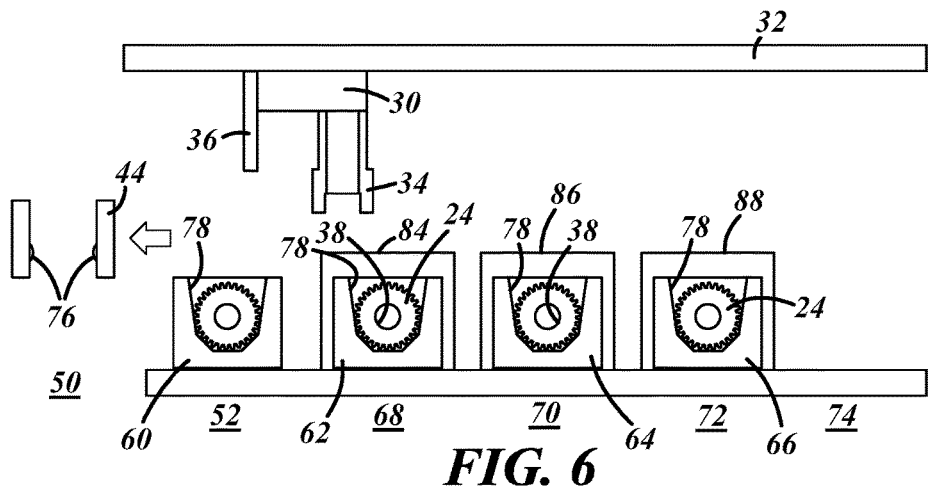
FIG. 6 is a partial, side view of pallets in the honing machine of FIG. 1 showing the loadbox retracted to a loadbox station.

FIG. 6 shows a side view of the pallets 60, 62, 64, and 66 in the honing machine 10 with an empty loadbox 44 retracted and positioned in the loadbox loading station or position 50. As illustrated, the pallet 60 contains gears 24 and is positioned at the pallet load station 52, with the remaining three pallets 62, 64, and 66 in the first, second and third honing or machining stations 68, 70, and 72.

Figure 7:
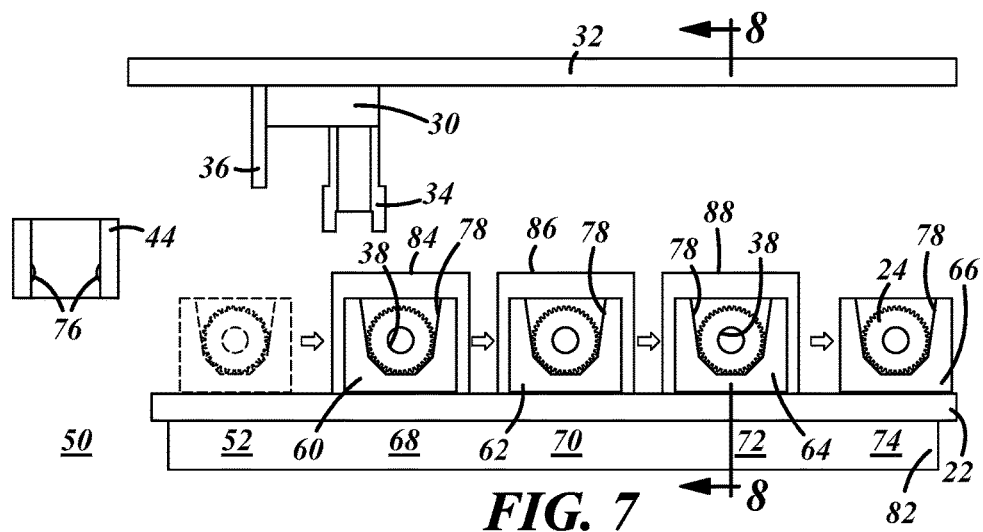
FIG. 7 is a partial, side view of pallets in the honing machine of FIG. 1 showing a pallet moved to an unload station.

FIG. 7 shows a side view of pallets 60, 62, 64, and 66 in the honing machine 10 wherein the pallet 66 has moved from the third honing or machining stations 72, see FIG. 6, to the unload station 74. At the same time, the remaining pallets 60, 62, and 64 also move or advance, in a left to right manner as indicated by the arrows, toward the unload station 74, leaving the pallet load station 52 empty. A conventional pallet drive or transfer mechanism 82 advances the pallets 60, 62, 64, and 66 as a group along the pallet rails 22.

Figure 8:
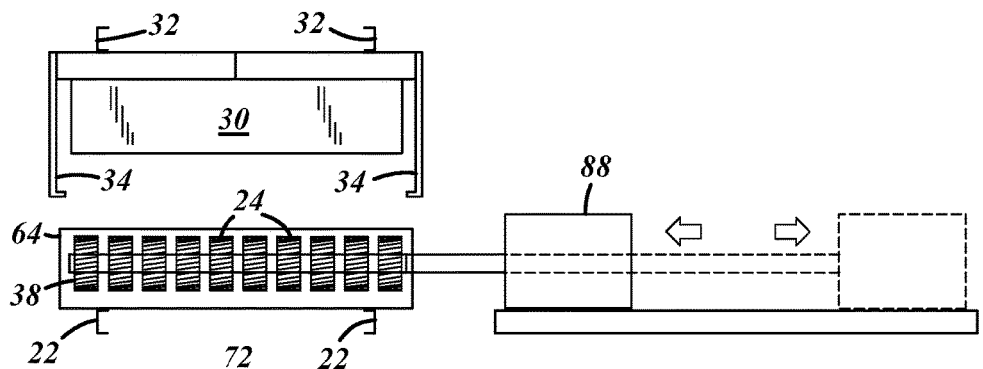
FIG. 8 is partial, sectional view taken along lines 8-8 of FIG. 7 showing the reciprocating motion of honing spindles relative to gears in a pallet.

FIG. 8 is a partial, sectional view, with portions removed for clarity, taken along lines 8-8 of FIG. 7 showing the reciprocal motion of a honing spindle 88 of the third honing or machining station 72 entering the bores 38 of the gears 24 at the third honing machining station 72. FIG. 8 also shows the gantry 30 and the pallet gripper mechanism 34 in a raised position above the pallets 64.

Figure 9:
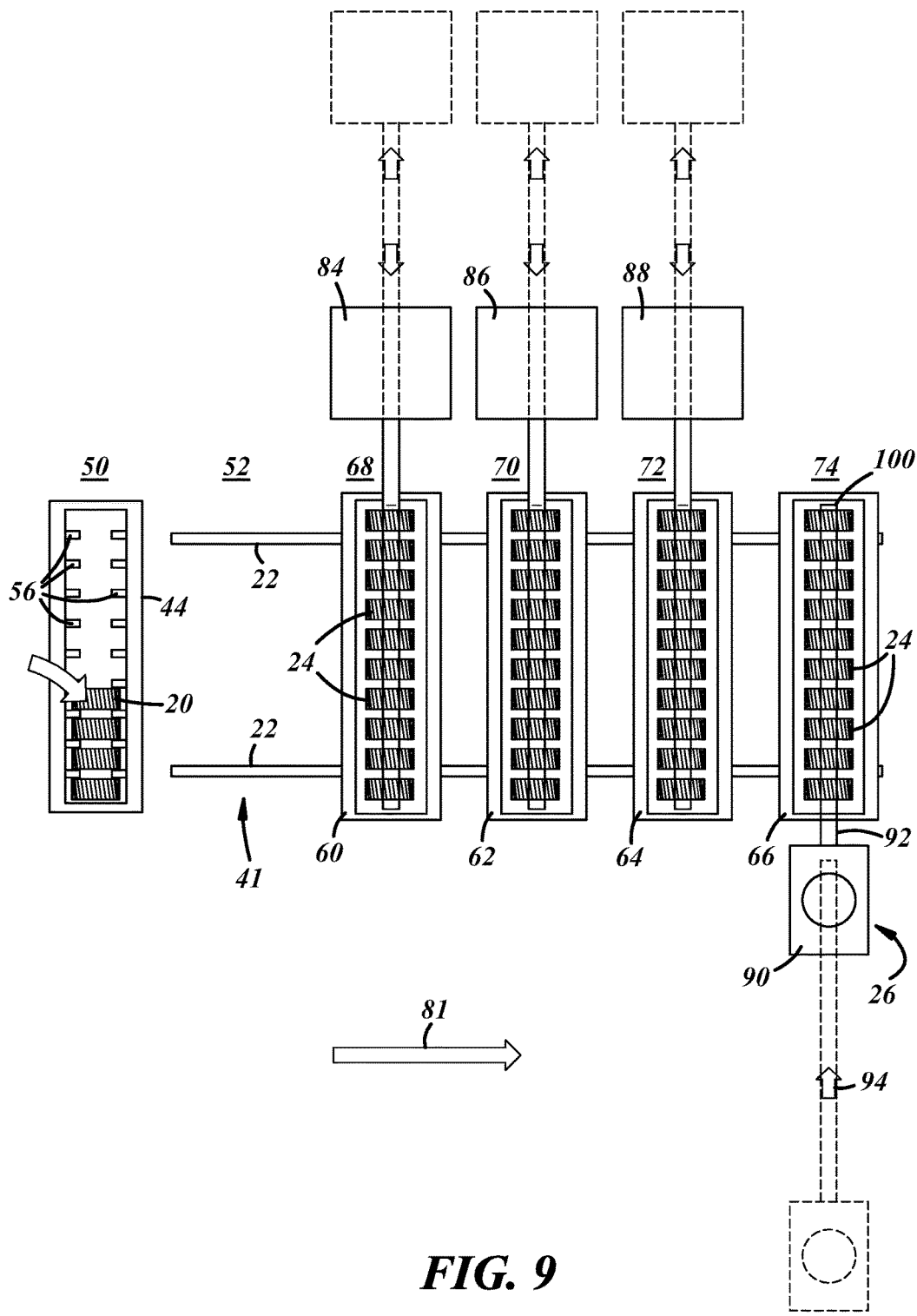
FIG. 9 is a schematic, top view showing pallets in the honing machine of FIG. 1 and the relative positions of the loadbox, the pallets, the honing spindles, and the skewer for removing gears from the pallet at the unload station.

FIG. 9 is a partial top view, with portions removed for clarity, illustrating pallet 60, 62, 64, and 66, and correspondingly gear 24, travel in the direction of the arrow 81 from the load station 52 to the unload station 74. FIG. 9 shows a top view of pallets 60, 62, 64, and 66 in the honing machine 10, and the relative positions of the honing spindles 84, 86, and 88, relative to the pallet load station 52, the machining stations 68, 70, and 72, and the pallet unload station 74. As the pallets 20 progress through the honing machine 10, the gears 24 in the pallets 60, 62, 64, and 66 are honed at the three honing or machining stations 68, 70, and 72. The honing tools, driven by respective machining spindles 84, 86, and 88 at the machining stations 68, 70, and 72, plunged into and out of the bores 38 in the gears 24 in the three pallets 60, 62, 64 to hone the bores 38 of the gears 24 simultaneously. The machining spindles 84, 86, and 88 may be driven at different speeds and may have different dwell times within the bores 38 of the gears 24 as required by the honing operation. More or fewer machining stations may be used to hone the gears 24 depending on the honing process and the amount of honing that is required for the finished gears to meet the required specifications. The pallets 60, 62, 64, and 66 advanced simultaneously through the honing or machining stations 68, 70, 72 to the pallet unload station 74. When a pallet reaches the unload station 74, a skewer positioner 90 advances the skewer 26, from its initial position shown in phantom, in the direction of arrow 94, to enter the bores 38 of the gears 24 in the pallet 66, and then lifts or raises the gears out of the pallet 66 as shown in FIG. 10.

Figure 10:
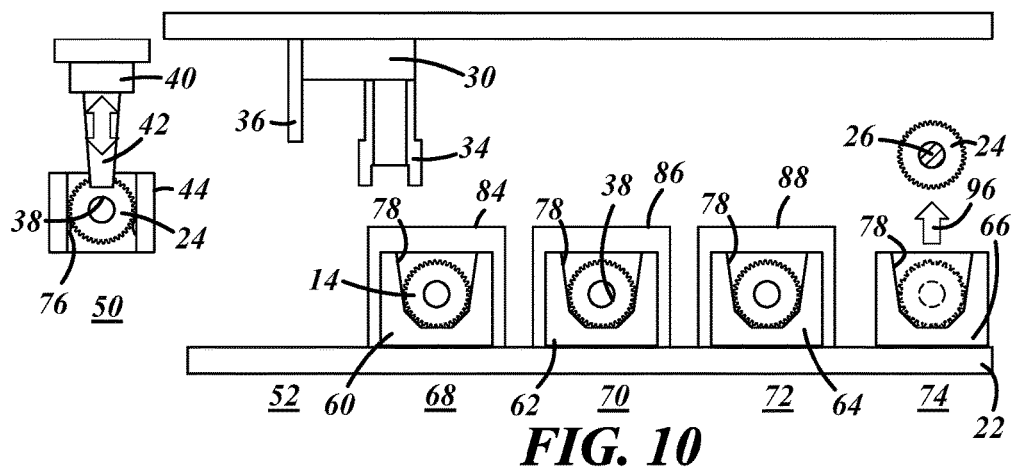
FIG. 10 is a partial, side view of the honing machine of FIG. 1 showing the skewer and gears raised out of the pallet at the unload station and the robot loading gears into the load box at the loadbox station.

FIG. 10 is a partial side view of the honing machine 10 showing the gears 24 on the skewer 26 lifted or raised out of the pallet 66 at the unload station 74 after the gears 24 have been honed at the respective honing or machining stations 68, 70, and 72. FIG. 10 also shows the robotic loader 40 loading gears 24 into the loadbox 44 at the loadbox station 50 whereby the load box 44 is loaded and ready for movement over a pallet returned to and positioned in the load station or position 52.

Figure 11:
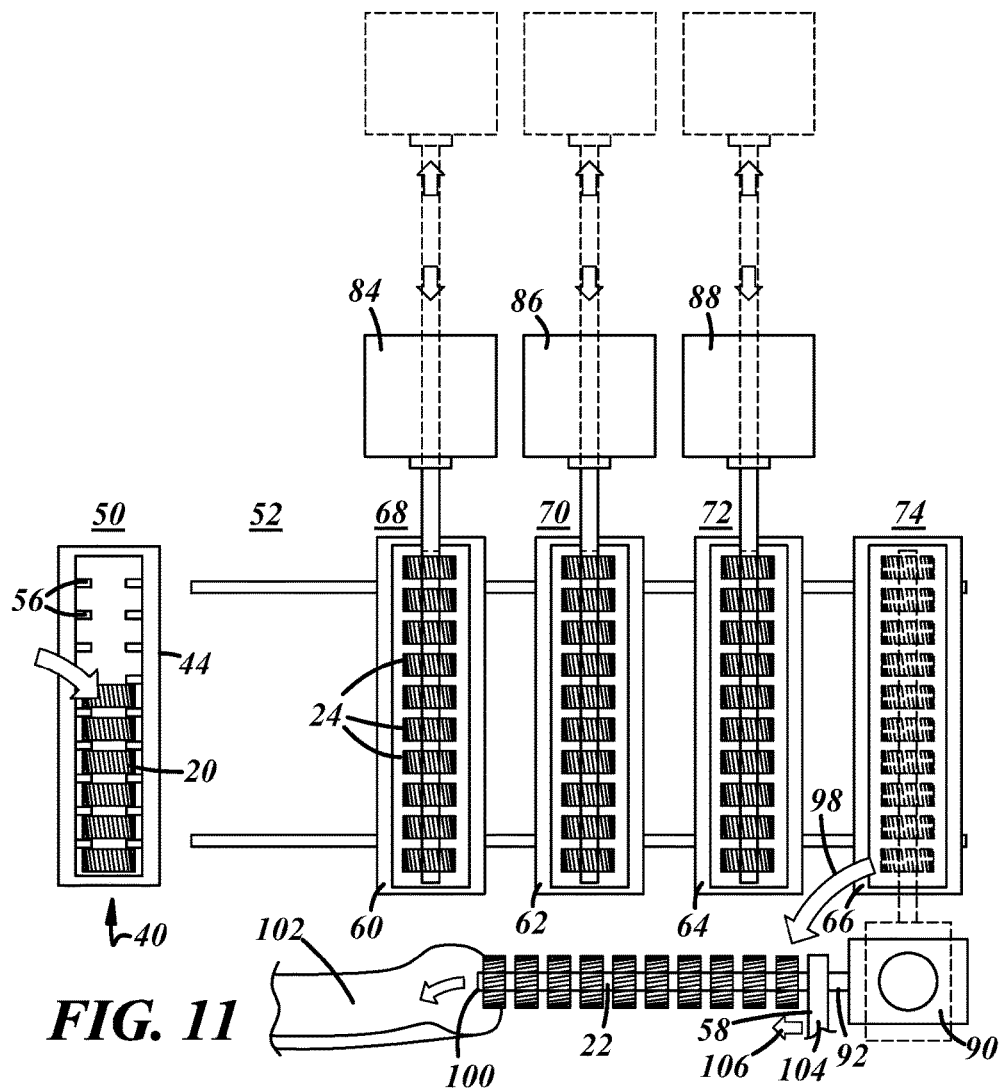
FIG. 11 is a schematic, top view of pallets in the honing machine of FIG. 1 showing the relative positions of the loadbox, the pallets, the honing spindles, and the skewer for removing gears at the unload station pivoted to a position to unload the gears from the skewer.

FIG. 11 is a top view of pallets 60, 62, 64, and 66 in the honing machine 10 showing the relative positions of the loadbox 44 as it is being loaded, three pallets 60, 62, and 64 in the three honing or machining stations 68, 70 and 72, and the machining spindles 84, 86, and 88. Also shown is pallet 66 with the gears 24, shown in phantom, after being removed by the skewer 26.

FIGS. 9-11 illustrates the skewer 26 removing the gears 24 from the pallet 66 located in the pallet unload station 74. The skewer 26 includes an elongated rod-like member 92, sized to penetrate the bores 38 in the gears 24, attached to the skewer positioner 90. Initially, as shown in phantom in FIG. 9, the skewer positioner 90 and rod-like member 92 are spaced from the pallet 66 in the pallet unload station 74. When the pallet 66 is in the pallet unload station, the skewer positioner 90 and rod-like member 92 move in the direction of the arrow 94 whereby the rod-like member 92 penetrates the bores 38 in the gears 24. Next, as shown in FIG. 10, the skewer positioner 90 moves in the direction of the arrow 96 to raise the gears 24 above the pallets 60, 62, 64, and 66. After being raised a sufficient height to clear the pallets 60, 62, 64, and 66, the skewer positioner 90, as illustrated in FIG. 11, pivots or rotates the rod-like member 92 approximately 90° in the direction of the arrow 98 from a position in alignment with the pallet 66 in the pallet unload station 74 to a discharge position wherein the end 100 of the rod-like member 92 is positioned adjacent or over a delivery chute 102. A stripper 104 moving in the direction of arrow 106, pushes the gears 24 off of the rod-like member 92 of the skewer 26 whereby the gears 24 drop into the delivery chute 102.

Figure 12:
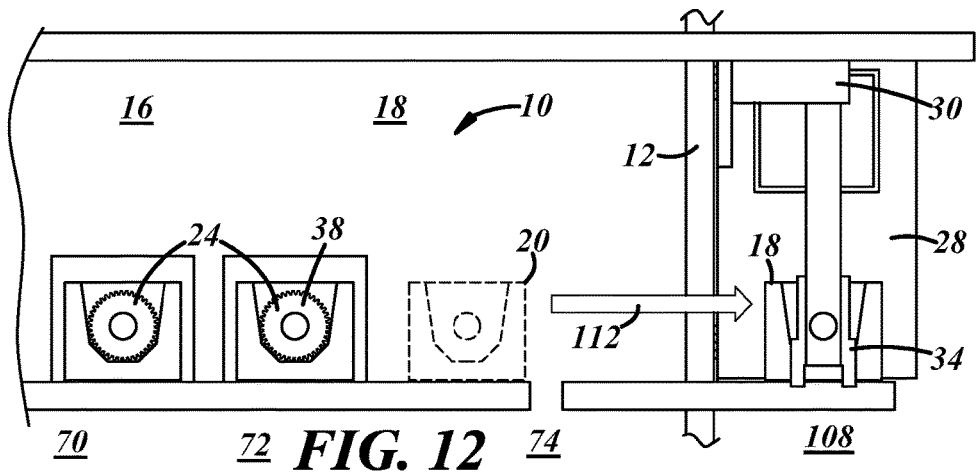
FIG. 12 is a partial, schematic side view of the honing machine of FIG. 1 showing a pallet removed from the honing machine.

FIG. 12 is a partial side view of the honing machine 10 showing an exemplary pallet 20 removed from the honing machine 10. The side access door 28 provided on the machine enclosure 12, adjacent to a pallet change-over station 108, allows an operator or other transfer mechanism access to a pallet 20 at the unload station 74. In the disclosed embodiment, the pallet 20 is removed from the unload station 74 to the pallet change-over station 108 for inspection or replacement purposes. For example, when changing out pallets and corresponding fixtures for different gears, the current pallet/fixture is moved from the unload station 74 to the changeover station 108 and removed. A new pallet/fixture is placed at the changeover station 108 and moved to the unload station 74 whereby, as set forth below, the gantry 30 transfers the new pallet/fixture to the pallet load station 52. As the disclosed embodiment requires only one more pallet than machining station, as each old pallet/fixture arrives at the unload station 74, it is removed and replaced with a new pallet/fixture that is in turn moved to the load station 52. Accordingly, the disclosed embodiment allows for a quick changeover. In addition, it is contemplated that the gantry rails 32 extend over the changeover station 108 whereby the gantry 30, and gripper mechanism 34, operates to lift the old pallet/fixture from the unload station 74 and transfer it to the changeover station 108. Rather than moving to the left, as shown by the arrow 110 in FIG. 14, the gantry 30 moves right, toward the arrow 112 in FIG. 12, to transfer the old pallet/fixture out of the machining and loading areas 16, 18 and place it at the changeover station 108. In an additional embodiment, the gantry 30 remains at the changeover station 108 until the old pallet/fixture is removed and replaced by a new pallet/fixture after which the gantry 30 is actuated to lift and transfer/move the new pallet/fixture to the pallet load position 52. In this manner, the gantry 30 both places and removes pallet/fixtures from the honing machine 10.

Figure 13:
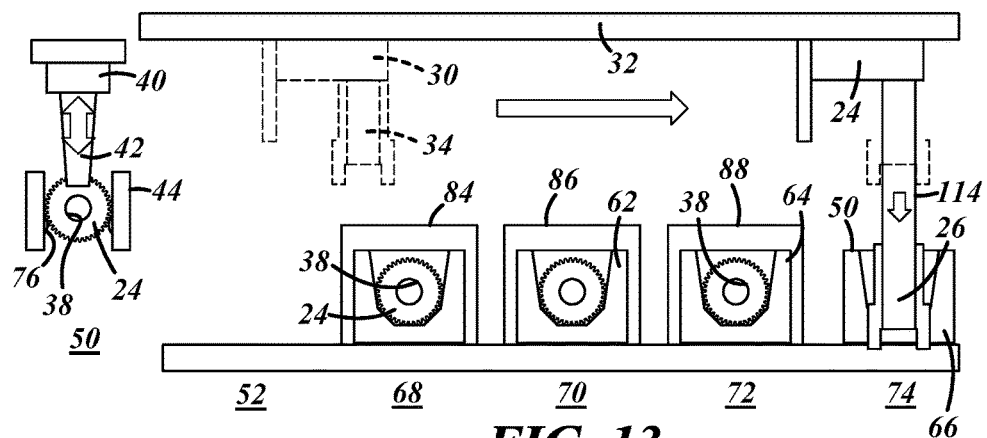
FIG. 13 is a schematic, side view of the honing machine of FIG. 1 showing the gantry moved to a position to grip a pallet at the unload station.

FIG. 13 is a side view of the honing machine 10 showing the gantry gripper 34 moving downward, in the direction of the arrow 114, above the unload station 74. Once positioned above the pallet unload station 74, the gantry 30 lowers so the gripper 34 mounted on the gantry 30 may engage the ends of the pallet 66 at the unload station 74. Other gripper mechanisms that engage the sides of the pallet 66 or the inside surface of the pallet 66 may be used.

Figure 14:
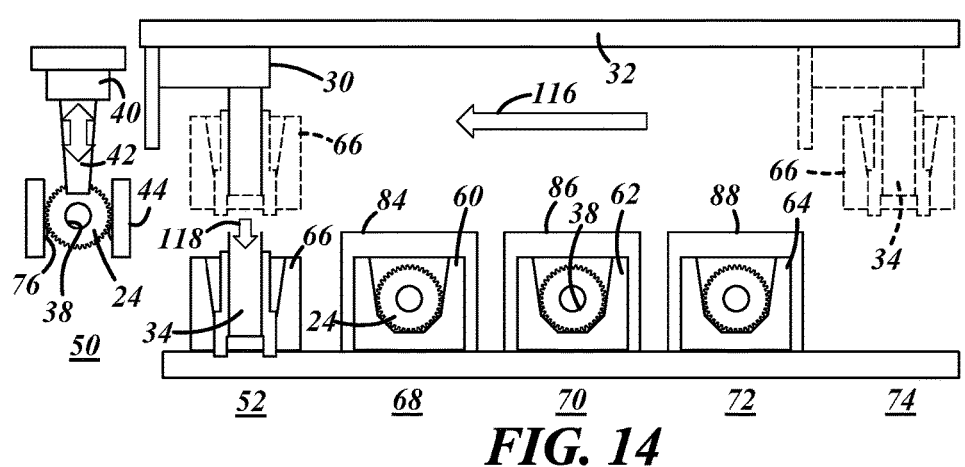
FIG. 14 is a schematic, side view of the honing machine of FIG. 1 showing the gantry transporting a pallet from the unload station to the pallet load station.

FIG. 14 shows the gantry 30 transporting the pallet 66, shown in phantom, in the direction of the arrow 116, from the unload station 74 to a position above the pallet load station 52. Once the pallet 66 is positioned above the pallet load station 52, the gantry 30 lowers, in the direction of the arrow 118, the pallet 66 onto the pallet load station 52.

Figure 15:
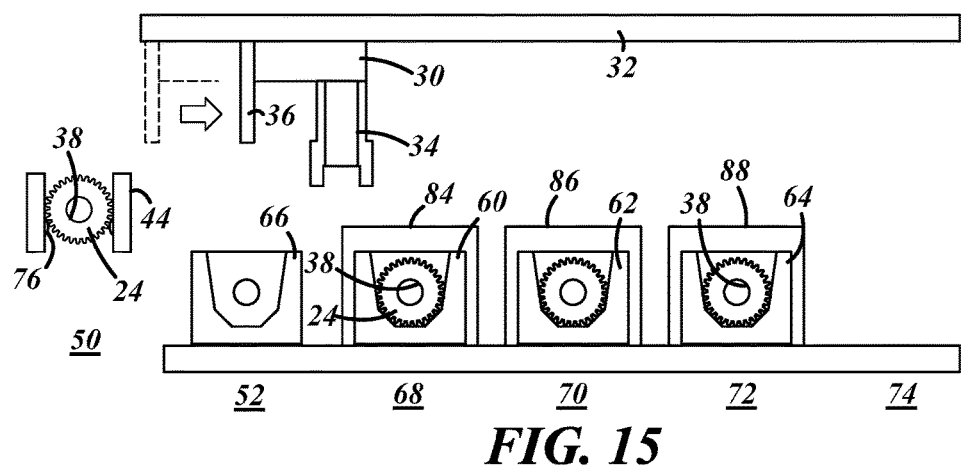
FIG. 15 is a schematic, side view of the honing machine of FIG. 1 showing the gantry with a ram on the gantry positioned over a pallet in the pallet load station.

FIG. 15 is a side view of the honing machine 10 showing the gantry 30, and ram 36 on the gantry 30, moved slightly to the right, in the direction of arrow 120, with the ram 36 positioned over the pallet 66 previously deposited in the pallet load station 52. After gears 24 have been loaded into the pallet 66 from the loadbox 44, the ram 36 lowers and contacts the gears 24 as described in connection with FIG. 5, and the process of honing the gears 24 may commence.

In operation, the honing machine 10 requires one more pallet than the number of machining stations to remain in continuous operation. In the disclosed embodiment, four pallets are used in a honing machine having three machining stations. Honing machines having a different number of machining stations may be used. The return of empty pallets from the unloading station 74 to the loading station 52 by the overhead gantry 30 accelerates the operation of the machine compared to prior art machines using a conveyor apparatus to return empty pallets. And loading of the loadbox 44 with a full complement of gears 24 while the machine 10 is honing gears at the machining stations 68, 70, and 72 allows an empty pallet, for example pallet 66, returned from the unload station 74 to the loading station 52 to be loaded with gears 24 from the loadbox 44. Once the loadbox is moved to a position over an empty pallet at the pallet load station, the loadbox can transfer the gears to the empty pallet in the same time required to load one gear into an empty pallet using prior art techniques.

Having described the process and the apparatus for carrying out the process, various modifications and alterations will occur to those skilled in the art, which modifications and alterations and intended to be within the scope of the process and the apparatus as defined in the appended claims.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of using a honing machine to hone the axial bores of gears comprising the steps of:
   using a robot to load the gears into a loadbox at a loadbox station with the bores of the gears in axial alignment;
   providing a number of pallets for transporting gears downstream along a pallet path through the honing machine, the pallet path including a pallet loading station, a plurality of machining stations, and a pallet unload station;
   moving the loadbox with the gears to a position over an empty pallet at the pallet load station and dropping the gears into the empty pallet;
   transferring the pallet from the pallet load station to a first machining station;
   performing a first honing operation on the bores of the gears at the first machining station;
   transferring the pallet to at least a second machining station for a second honing operation on the bores of the gears;
   transferring the pallet to the pallet unload station and removing the gears from the pallet to create an empty pallet;
   gripping the empty pallet with an overhead gripper on a movable overhead gantry and returning the empty pallet to the pallet load station using the movable gantry;
   loading the returned empty pallet at the pallet load station with gears from the loadbox; and
   advancing the pallet with the gears from the loadbox to the first machining station.

2. The method of claim 1 including:
   simultaneously positioning one pallet at the pallet load station and one pallet at each machining station; and
   advancing the pallets as a group through the honing machine and returning an empty pallet from the pallet unload station to the pallet loading station using the movable overhead gantry, whereby the honing machine provides a continuous honing operation on gears and requires only one more pallet than the number honing stations in the apparatus.

3. The method of claim 1 including using a probe to pre-gauge the bores of the gears while the gears are in the loadbox.

4. The method of claim 1 including using a probe to pre-gauge the bores of the gears one at a time while the gears are in the loadbox.

5. The method of claim 1 including providing fixtures in the empty pallet for receiving the gears; and
   holding the gears in the fixtures from the time the gears are received in the pallet from the loadbox to the time the gears are removed from the pallet at the unload station.

6. The method of claim 1 including positioning a ram over the pallet after the pallet has received gears from the loadbox; and
   using the ram to seat the gears in the pallet when the gears are dropped from the loadbox into the pallet.

7. The method of claim 1 including mounting a ram on the movable gantry, whereby after the movable gantry with the overhead gripper returns an empty pallet to the pallet load station and the loadbox has dropped the gears into the pallet, the movable gantry shifts to move the ram to a pre-engagement position to align the ram over the gears in the pallet.

8. The method of claim 1 including transferring the pallet to a third machining station downstream from the second machining station for a third honing of the bores.

9. The method of claim 1 including engaging the bores of the gears with a skewer that enters the bores of the gears in the pallet at the pallet unload station;
   raising the skewer to remove the gears from the pallet at the pallet unload station;
   positioning the end of the skewer over a delivery chute; and
   using a stripper to push the gears off of the skewer so the gears drop onto the delivery chute.

10. The method of claim 1 including removing a pallet from the pallet unload station via a side access door for pallet inspection or pallet replacement.

11. A honing machine for honing the axial bores of gears comprising:
    a robot to load the gears into a loadbox at a loadbox station with the bores of the gears in axial alignment;
    a pallet load station downstream from the loadbox station;
    a loadbox mover for moving the loadbox from the loadbox station to a position over the pallet load station;
    a moveable member releasing the gears in the loadbox to an empty pallet in the pallet load station;
    a first machining station downstream from the pallet load station performing a first honing operation on the bores of the gears;
    a second machining station downstream from the first machining station performing a second honing operation on the bores of the gears;
    a pallet unload station downstream from the second machining station;
    a pallet path through the honing machine from the pallet load station to pallet unloading station, said pallet path including the first and second machining stations;
    a pallet drive engaging and advancing a plurality of pallets along the pallet path;
    a member moving between a first position and a second position wherein in said second position said gears are raised out of the pallet at the pallet unload station; and
    an overhead gripper on a movable gantry gripping the pallet at the unload station and returning the pallet to the pallet load station, whereby the pallet can be reloaded with additional gears and the additional gears can be honed, and whereby the apparatus can continuously hone gears using only one pallet at each machining station and one pallet at the pallet loading station.

12. The honing machine of claim 11 including a probe measuring the dimensions of the bores by inserting the probe into the gears one-by-one as the gears are placed into the loadbox by the robot.

13. The honing machine of claim 11 including fixtures in the empty pallet which receive the gears, whereby the gears are held in the fixtures from the time the gears are received in the pallet at the pallet load station to the time the gears are removed from the pallet.

14. The honing machine of claim 11 including a ram connected to the movable gantry, the movable gantry moving the ram to a pre-check position over the gears in the pallet at the pallet load station; and said ram positioned over the pallet after the pallet has received gears from the loadbox, whereby the ram is lowered to check the position of the gears in the pallet when the gears are transferred from the loadbox into the pallet.

15. The honing machine of claim 11 including a third machining station downstream from the second machining station for performing a third honing of the bores.

16. The honing machine of claim 11 including wherein said member includes a skewer operative to enter the bores of the gears and remove the gears from a pallet at the unload station;

a skewer positioner coupled to the skewer for raising the skewer to the gear raised position; and a stripper to strip the gears off of the skewer.

17. The honing machine of claim 11 including a pallet inspection station downstream from the unload station, whereby a pallet may be removed from operation by transferring the pallet from the unload station to the pallet inspection station for inspection, replacement, or repair.

18. A honing machine comprising:

a plurality of honing stations;

a plurality of pallets transporting workpieces between said honing stations;

a load station and an unload station, both said load station and said unload station separate and spaced from said honing stations;

a gantry, said gantry including a pallet gripper operative to engage said pallet wherein said gantry moves said pallets from said unload station to said load station; and wherein the number of said pallets in said honing machine is always less than the number of said honing stations.

19. The honing machine of claim 18 including a skewer for removing the gears from a pallet at the unload station, whereby the skewer enters the bores of the gears;

a skewer positioner coupled to the skewer for raising the skewer to remove the gears from the pallet and positioning the end of the skewer over a delivery chute; and a stripper to strip the gears off of the skewer so the gears drop onto the delivery chute.

20. The honing machine of claim 18 including a loadbox for receiving gears;

a loadbox station, separate from said load station, said unload station and said honing stations, wherein said load station is spaced from and downstream from the loadbox station;

a loadbox mover for moving the loadbox from the loadbox station to a position over the load station; and a moveable member releasing the gears in the loadbox to an empty pallet in the pallet load station.

* * * * *